(12) United States Patent
Talwalkar et al.

(10) Patent No.: US 6,625,237 B2
(45) Date of Patent: Sep. 23, 2003

(54) NULL-PILOT SYMBOL ASSISTED FAST AUTOMATIC FREQUENCY CONTROL (AFC) SYSTEM FOR COHERENT DEMODULATION OF CONTINUOUS PHASE MODULATION (CPM) SIGNALS AND METHOD FOR IMPLEMENTING SAME

(75) Inventors: Sumit Anil Talwalkar, Plantation, FL (US); Charles Leroy Sobchak, Davie, FL (US); Leng H. Ooi, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 211 days.

(21) Appl. No.: 09/919,553

(22) Filed: Jul. 31, 2001

(65) Prior Publication Data

US 2003/0026361 A1 Feb. 6, 2003

(51) Int. Cl.[7] ................................................ H04L 27/06
(52) U.S. Cl. ........................................ 375/344; 455/139
(58) Field of Search .............................. 375/344, 326, 375/362; 455/139, 182.2

(56) References Cited

U.S. PATENT DOCUMENTS 5,712,877 A    1/1998   Ho et al.
5,898,665 A  * 4/1999   Sawahashi et al. ......... 370/342
6,456,672 B1 * 9/2002   Uchiki et al. ............... 375/344

FOREIGN PATENT DOCUMENTS

JP         408223239 A * 8/1996 ............ H04L/27/34

OTHER PUBLICATIONS

IRE Transactions on Electronic Computers "The CORDIC Trigonometric Computing Technique" pp. 330–334, Sep. 1959.

* cited by examiner

*Primary Examiner*—Mohammad H. Ghayour
(74) *Attorney, Agent, or Firm*—Frank Scutch

(57) ABSTRACT

A null-pilot symbol assisted fast automatic frequency control (AFC) system for coherent demodulation of carrier phase modulation (CPM) includes (209) a pilot clock driven phase differentiator (252,253,255) for operating once every pilot clock cycle to determine the difference between the phase at a current pilot symbol location and the phase at a previous pilot symbol location. A frequency offset selector (256) is then used for choosing the most likely frequency offset from amongst a set of all frequency offsets that give rise to the same phase difference.

8 Claims, 3 Drawing Sheets

NULL-PILOT SYMBOL ASSISTED FAST AUTOMATIC FREQUENCY CONTROL (AFC) SYSTEM FOR COHERENT DEMODULATION OF CONTINUOUS PHASE MODULATION (CPM) SIGNALS AND METHOD FOR IMPLEMENTING SAME

TECHNICAL FIELD

This invention relates in general to digital communications systems and more particularly to synchronization of digital information in a digital communications system for coherent demodulation of continuous phase modulation signals.

BACKGROUND

Frequency synchronization is essential for reliable digital communication between the transmitting (Tx) and receiving (Rx) radios. As is known in the art, both transmitter and receiver should have the same nominal frequencies when communicating together. In practice the reference oscillators in the two radios (Tx and Rx) have different errors from the nominal frequency. Therefore the receiver needs to "tune" within a certain tolerance of the actual transmitter frequency to receive information. This is commonly known as frequency synchronization. In particular, communication systems using coherent demodulation methods are highly sensitive to the frequency difference between the Tx and Rx radio frequencies. An automatic frequency control system (AFC) is required to bring and maintain the frequency error to within the tolerance allowed by the modulation scheme.

Most mobile communication links are susceptible to the effects of multi-path fading in channel. This causes distortion of the phase of the communication signal. This is particularly problematic in the case of continuous phase modulation (CPM) signals; wherein the information is contained in the phase of the signal. Pilot symbols are symbols that are known a-priori to the receiver that are periodically inserted by the transmitter in the transmitted sequence to aid the receiver to estimate the phase distortion caused by the channel. In the case of continuous phase modulation (CPM), every pilot location needs to have a symbol to bring the phase state to a "known" state. This is generally referred to as the "null" symbol. A typical null-pilot-symbol aided continuous phase modulation system is taught by Ho et al. in U.S. Pat. No. 5,712,877 and is herein incorporated by reference. Ho et al. teaches an apparatus for transmitting and receiving digital information using a pilot symbol insertion device for periodically inserting data dependent pilot symbols into frames of digital data for subsequent channel phase distortion estimation.

One solution for fast acquisition enables the operation of a transmit interrupt feature that is one of the distinguishing features of carrier phase modulation (CPM) used with the new Digital Interchange of Information & Signaling (DIIS) standard that is intended to enable the transition from the analog technology in today's low tier Private Mobile Radio (PMR) systems. This type of system enables a higher speed (12 Kbps) digital communication supporting both speech and data. This is an evolution from an earlier European standard, Binary Interchange of Information and Signaling (BIIS) also known as ETS300.230.PMR protocol (DIIS).

The operation of a sync acquisition system depends on a known sequence of thirty symbols that is periodically (once every 720 ms) embedded in the transmitted symbol bit stream. This sequence of symbols, already known to the receiver, is called the synchronization word. Any subsequent call related information is generally sent immediately after the sync word. In this way, any receiver when establishing initial communication, starts looking for the sync word and call information to decide whether to participate in the communication or "call". Additionally, pilot symbols are inserted in the data stream to aid the receiver to estimate the channel phase distortion. The pilot symbols are inserted much more frequently (once every 20 ms) than the sync word. Therefore a pilot symbol based AFC gets many more estimates of the frequency error than a sync word based frequency control for fast and accurate frequency correction.

Coherent demodulation requires the knowledge of frequency and phase of the received signal. Even with the same nominal frequencies, there is always a difference between the actual frequency of oscillators of the transmitting and receiving radios. Automatic frequency correction (AFC) is used to estimate and correct this frequency offset in the received signal. It is necessary to correct the frequency offset in as short an amount of time as possible to a high degree of accuracy. Thus, it is necessary to address the problem of fast acquisition of frequency synchronization. This issue becomes much more significant in case of a late entering radio, where a call is already in progress. The time spent in acquiring frequency synchronization implies additional loss of symbols. This fast frequency acquisition becomes crucial.

The functional diagram of a typical digital receiver may be similar to the one shown in prior art FIG. 1. A common issue associated with this type of receiver is acquisition time. Acquisition time is the time it takes to sync transmitted data with received data i.e. the time during which the receiver cannot receive data since it is not yet in sync with the transmitted data. Digital in-phase (I) and quadrature (Q) baseband (zero center frequency or low IF or very low IF) signals 102 are input to a coarse automatic frequency control (AFC) 104 for bringing the range of the radio frequency (RF) input signal within the range of a sharp digital channel select (CS) filter 106.

Although the CS filter typically has a 3-dB bandwidth at 3 KHz for the DIIS modulation, such CS filter is chosen to select the desired signal while rejecting any off-channel power. Without the coarse AFC 104 however, the digital signal might be shifted out of the CS passband in view of the frequency. Typically for DIIS modulation it is required to bring the digital I-Q input signal 102 within 600 Hz of the center frequency of the CS filter 106 or too much signal is lost.

The filtered signal is then passed to frame sync detector 108 which is a device looking for a sequence of digital symbols that is known to the receiver apriori. Thus anytime the receiver detects energy within the IF filter passband, it begins the process of detecting a known sequence of bits for frame symbolization. By using the fine symbol time estimator 110, the receiver determines the boundary between symbols and also achieves frame synchronization (i.e. recognizes the known pattern of incoming bits of information).

Based on the time symbol estimation the receiver 100 will next do a fine frequency estimation to further reduce the frequency error between the transmitter and receiver frequencies. In order to properly decode data it is necessary to make this frequency error smaller than the tolerance of the symbol detection scheme. The tolerance could be as small as 10 Hz in case of coherent detection of DIIS signal or 100 Hz for non-coherent detection of DIIS signal. Since time synchronization has already been achieved, the fine frequency estimation works on known symbols using a fine frequency estimator 112. Since the coarse AFC 104 can only tune the incoming I-Q baseband signal to within 600 Hz, the fine frequency estimator 112 works to fine tune the frequency of incoming data to approximately with 10 Hz in order to property detect the incoming data symbol. This correction is applied to mixer 114 where it is mixed with the signal from the IF filter 106. The output of the mixer 114 is then applied to the symbol detector 116 where it is then properly detected.

The prior art receiver synchronization system as seen in FIG. 1 has several weaknesses. The CS filter with a 3-dB bandwidth at 3 KHz is typically required for meeting an adjacent channel interference protection requirement. With this 3 dB bandwidth, a maximum offset of 600 Hz is acceptable at the input of the IF filter. According to related standards specifications, a mobile transmitter frequency is allowed to be up to 1.5 KHz away from its nominal value for a channel separation of 12.5 KHz. If the baseband I-Q signal is directly fed to the CS filter, in the worst case, with a difference of 3 KHz between Tx and Rx, a significant part of the desired signal gets attenuated by the CS filter. This accounts for the coarse AFC 104 placed before the CS filter 106. The coarse AFC 104 is supposed to bring the filter offset down form 3 KHz to 600 Hz. The coarse AFC 104 however has to operate on unknown data symbols before the sync word, for the sync word to pass through the IF filter. This ultimately leads to a greater than acceptable delay and a period in which no synchronization occurs where the receiver is unable to receive information. Furthermore the sync word based prior art can generate a new estimate for frequency error much less often (once every 720 ms).

Therefore the needs exists to provide a digital receiver synchronization system for continuous phase modulation that can easily and accurately provide frequency synchronization to an incoming data stream with minimal delay to prevent any loss of incoming digital information.

DETAILED DESCRIPTION OF THE PREFERRED EMBODIMENT

Figure 1:
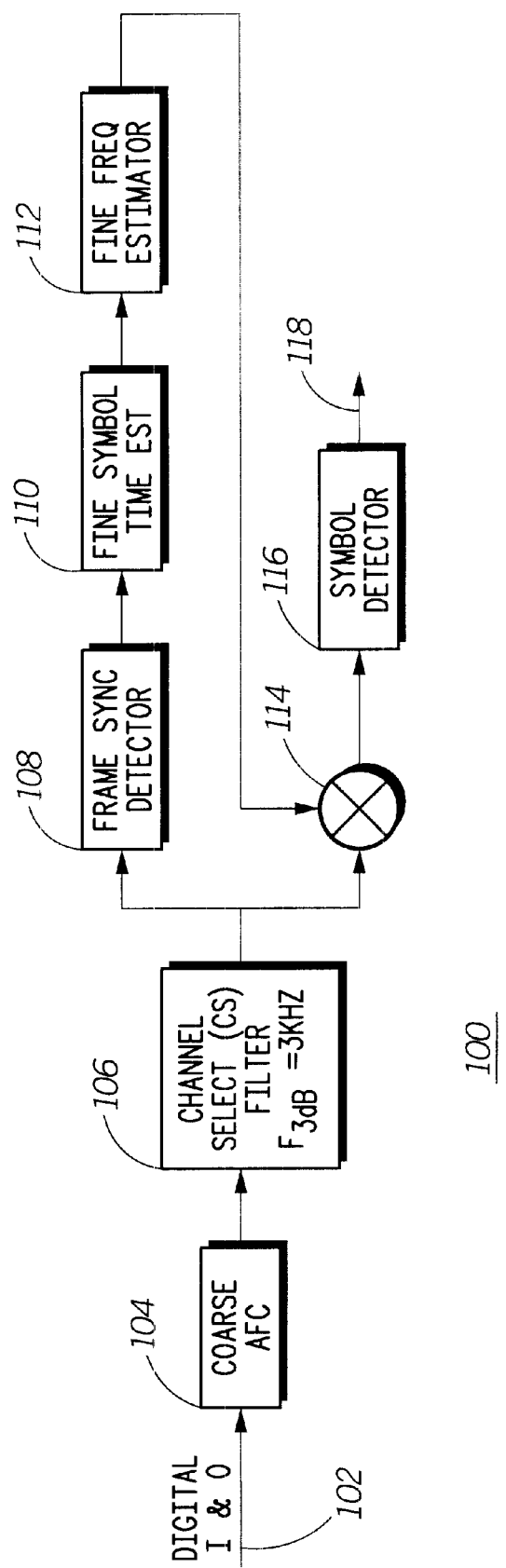
FIG. 1 is a prior art block diagram showing synchronization for a typical digital receiver system.
Figure 2:
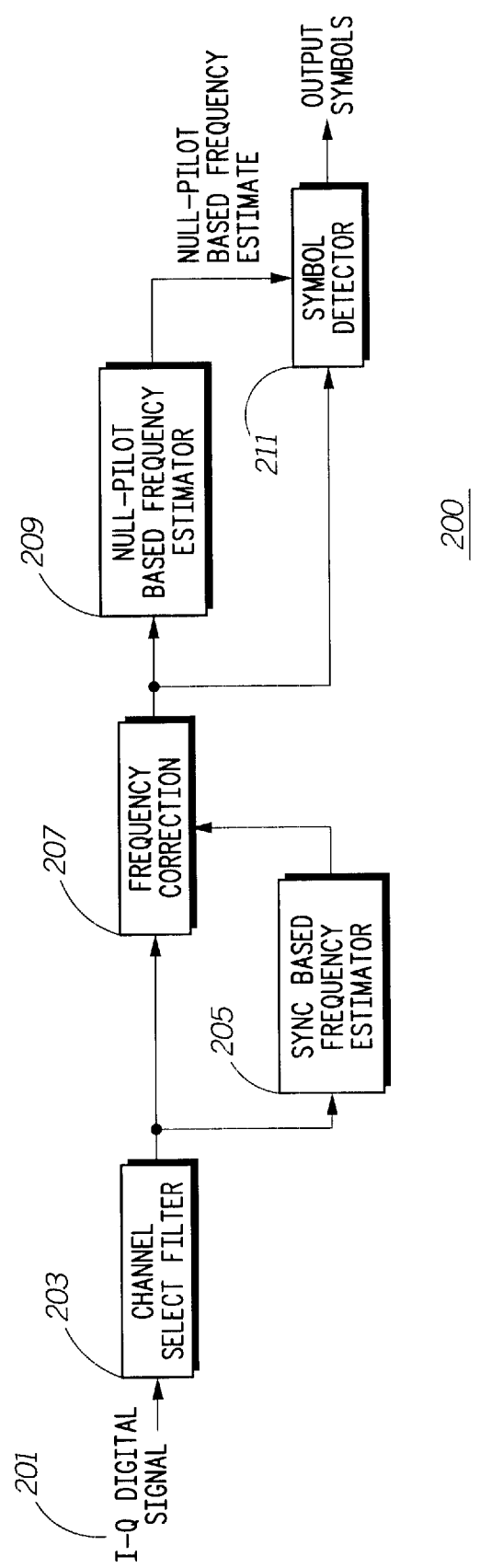
FIG. 2 is a block diagram showing operation of the null-pilot symbol assisted fast AFC system according to the present invention.

Referring now to FIG. 2, a high level functional diagram of the digital baseband path of the null pilot symbol assisted fast automatic frequency control (AFC) system 200 in accordance with the preferred embodiment of the invention includes an in-phase (I) and quadrature (Q) I-Q digital input signal 201. The I-Q input signal 201 is then passed through a channel select filter 203 that acts to remove off-channel noise power while letting through the desired I-Q signals. Then, a sync based frequency estimator 205 or any equivalent frequency estimator, estimates the frequency offset of the signal from the channel select filter 203 and corrects in a frequency correction circuit 207 such as a digital frequency mixer. The corrected signal from the frequency correction circuit 207 has some residual frequency error that needs to be corrected before coherent demodulation of the CPM signal. This signal is then directed into the null-pilot based frequency estimator 209 where a frequency estimate of the residual frequency error (that is left uncorrected by 207) is generated using some data processing described later. This frequency correction estimate is used with from the output of the frequency correction circuit 207 by the symbol detector 211 to provide a fine frequency correction estimate.

Figure 3:
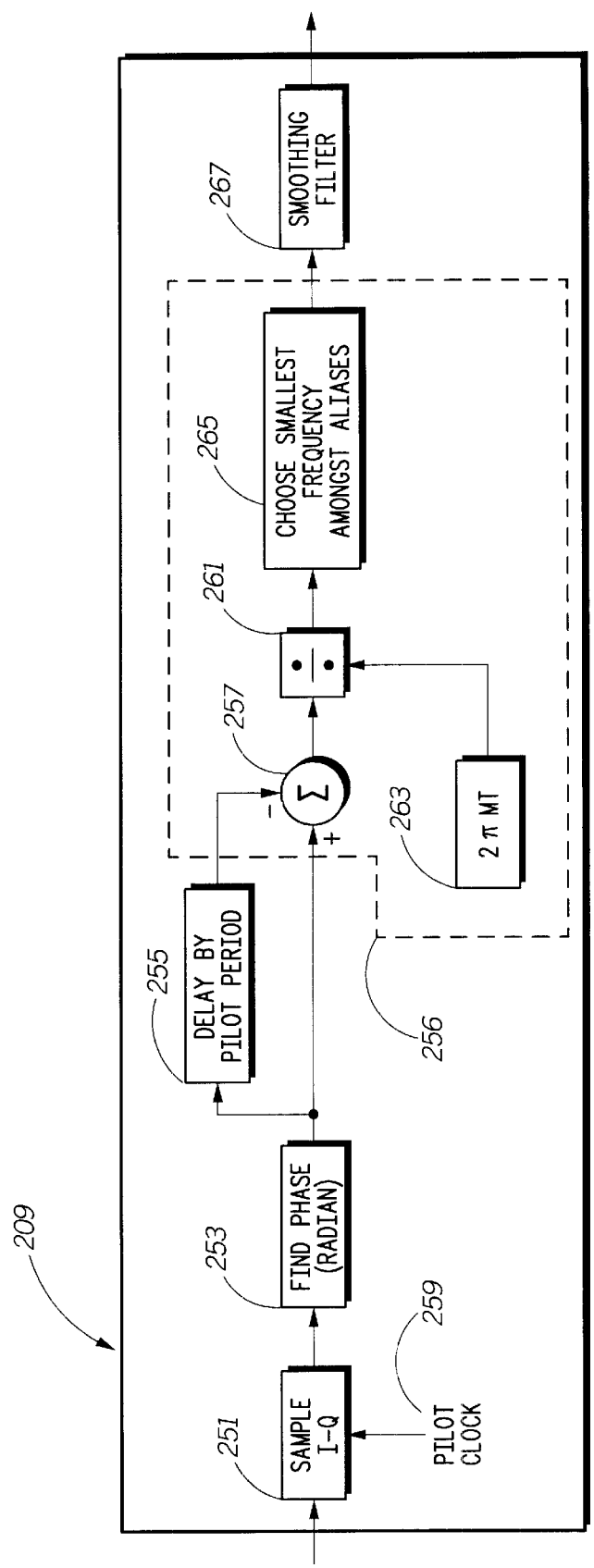
FIG. 3 is a flow chart diagram showing operation of the null-pilot symbol assisted fast AFC system according to the preferred method of implementing the invention.

FIG. 3 shows the details of the null-pilot based frequency estimator 209. In the frequency estimator, the frequency corrected I-Q signal is first sampled 251 on the pilot clock 253. The pilot clock 259 has the same frequency as the pilot symbols input with the signal input to the null-pilot based frequency estimator 209. Therefore if the pilots are inserted once every 20 ms, then the pilot clock has a frequency of 50 Hz. Following the sampling operation the phase of the complex I-Q signal is found in pilot clock 253 using suitable algorithm such as a coordinate rotation digital computer (CORDIC). The phase of the complex signal is stored 255 in the memory element to provide a phase delay.

The phase delayed signal is then directed from the memory element to a series of processing steps 256 such that may be preformed using a microprocessor. The microprocessor works to then determine the difference of the phase at the previous pilot location and the current pilot location is then determined 257 using a subtraction unit. This phase difference is divided by the pilot period (M*T, where M represents the number of symbols between successive pilot symbol locations and T is the symbol period) to obtain an estimate of the residual frequency error at the output of the divider 261. The factor of $2\pi$ is used to convert 263 a radian per second estimate into a cycle per second (Hz) value. It should be noted that many different values of the residual frequency error give rise to the same phase difference at the output of 257. All these possible values of residual frequency errors are referred to as "aliases".

Afterward, the most probable of these alias values is determined 265. This is done as follows: Suppose the output of the division 261 is $f_1$. Then, the residual frequency estimate selected is: $f_{OFFSET}=m*f_{ALIAS}+f_1$ where the number m is chosen such that the magnitude of $f_{OFFSET}$ is minimized. Although processing steps 256 as defined herein, it will be evident to those skilled in the art that any number or processing steps might be used to achieve the same result.

The determination of the alias selection 265 is then passed through a smoothing filter 267. The output of the smoothing filter is passed to the symbol detector 211 as seen in FIG. 2.

The process for Null-Pilot Symbols Assisted fast AFC as described herein may be expressed mathematically.

(1) The phase of a continuous phase modulation signal for the $k^{th}$ symbol interval corresponding to the symbol $I_k$ may be written as, $$\varphi(t, I_k, \sigma_k) = 2\pi h I_k q(t-kT) + 2\pi h \left( \sum_{i=k-L+1}^{k-1} I_i q(t-iT) \right) + \sigma_k, \text{ for}$$

$$(kT \le t < (k+1)T).$$

Here $\sigma_k$ is the current phase state due to previous symbols, T is the symbol period, h is the modulation index and q(t) is the cumulative phase function (running integral of the impulse response of the phase shaping filter).

(2) Suppose the pulse shaping filter is non-zero over the interval 0<T<LT and very small for t<0 and t>LT. Then, the current state of the modulator is given by, $$\sigma_k = \pi h \sum_{i=0}^{k-L} I_i.$$

(3) Rewriting the expression for phase during the $k^{th}$ symbol, $$\varphi(t, I_k, \sigma_k) = 2\pi h I_k q(t-kT) + 2\pi h I_{k-1} q(t-(k-1)T) + \sigma_k, \text{ and}$$

$$\sigma_k = \pi h \sum_{i=0}^{k-2} I_i.$$

(4) Suppose one null symbol and two pilot symbols (P1 and P2) are inserted at each pilot location once every M symbols. Then, the phase during the second pilot symbol after each null symbol at the $n^{th}$ pilot location, $(nM+2)T<t<(nM+3)T$, may be written as $$\phi(t)=2\pi h[P2 \times q(t-(nM+2)T)+P1 \times q(t-(nM+1)T)]+2\pi K_n, \text{ for } n=1,2,\ldots$$

(5) Here the integer $K_n$ is given by $$K_n = \frac{h}{2} \sum_{i=0}^{nM} I_i.$$

(6) The received signal with a residual frequency offset of $f_{OFF}$ can be expressed as $$r(t)=c(t)s(t)\exp[j2\pi f_{OFF}t]+w(t)$$

Here c (t) represents the complex fading channel.

(7) Then the phase of the for the nth null pilot symbol location (as found at the output of 253 in FIG. 3), $(nM+2)T<t<(nM+3)T$, is $$\angle r(t)=\theta_r(t)=\theta_c(t)+\phi(t)+2\pi f_{OFF}t,$$

(8) Then, the phase of the received signal during the second pilot symbol following the nth null symbol can be written as $$\theta_{n,r}(t)=\theta_r(t+(nM+2)T) \text{ for } 0<t<T.$$

(9) Then, the difference between the phase at the current pilot location n and the previous pilot location n−1 as calculated at the output of 261 in FIG. 3

$$\theta_{n,r}(t)-\theta_{(n-1),r}(t)=\Delta\theta_{n,c}+2\pi f_{OFF}MT+2\pi[K_n-K_{n-1}], \ 0 \leq t<T, \text{ for } n=2,3,\ldots.$$

where:

$$\theta_{n,c}=\theta_c(t+(nM+2)T)-\theta_c(t+((n-1)M+2)T) \text{ for } 0 \leq t<T.$$

Then the offset frequency can be expressed as $$f_{OFF} = \left(\frac{\theta_{n,r}(t)-\theta_{(n-1),r}(t)}{2\pi MT}\right) - \left(\frac{\Delta\theta_{n,c}}{2\pi MT}\right) - \left(\frac{K_n-K_{n-1}}{MT}\right),$$

$$0 \leq t < T, \text{ for } n = 2, 3, \ldots.$$

Thus, in summary the present invention is directed to a fast automatic frequency control (AFC) using null-pilot symbols inserted periodically at a pilot frequency in a carrier phase modulation (CPM) system and includes a memory for storing the phase information of an in-phase (I) and quadrature (Q) complex digital input signal at each pilot symbol location. The memory includes a phase detector for deterring the phase of the complex digital in-phase (I) and quadrature (Q) digital signal sample and a phase detector for determining the phase. A pilot clock driven phase differentiator is then used at the output of the memory for operating once every pilot clock cycle to determine the difference between the phase at the current pilot symbol location and the phase at the previous pilot symbol location. A frequency offset selector uses a process to mathematically choose the most likely frequency offset from amongst the set of all frequency offsets that give rise to the same phase difference. The system further a smoothing filter for reducing noise of the frequency estimate from the frequency offset selector.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims. As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A null-pilot symbol assisted fast automatic frequency control (AFC) system for coherent demodulation of carrier phase modulation (CPM) comprising:
   a pilot clock driven phase differentiator for operating once every pilot clock cycle to determine the difference between the phase at a current pilot symbol location and the phase at a previous pilot symbol location; and
   a frequency offset selector for choosing the most likely frequency offset from amongst a set of all frequency offsets that give rise to the same phase difference.

2. A null-pilot symbol assisted fast AFC according to claim 1, further comprising:
   a smoothing filter for reducing noise of the frequency estimate from the frequency offset selector.

3. A fast automatic frequency control (AFC) using null-pilot symbols inserted periodically at a pilot frequency in a carrier phase modulation (CPM) system comprising:
   a memory for storing the phase information of an in-phase (I) and quadrature (Q) complex digital input signal at each pilot symbol location;
   a pilot clock driven phase differentiator for using the output of the memory for operating once every pilot clock cycle to determine the difference between the phase at the current pilot symbol location and the phase at the previous pilot symbol location; and
   a frequency offset selector for choosing the most likely frequency offset from amongst the set of all frequency offsets that give rise to the same phase difference.

4. A fast automatic AFC as in claim 3, further comprising:
   a smoothing filter for reducing noise of the frequency estimate from the frequency offset selector.

5. A fast AFC as in claim 3, wherein the memory includes:
   a sampler for sampling the complex in-phase (I) and quadrature (Q) digital signal once every pilot clock.

6. A fast AFC as in claim 5, wherein the memory further includes:

a phase detector for determining the phase of the complex in-phase (I) and quadrature (Q) digital signal sample from the sampler.

7. A method for extracting the frequency offset information based on null-pilot symbols periodically inserted by a transmitter comprising the steps of:

operating a pilot driven phase differentiator once every pilot clock cycle;

determining the difference between the phase at a current pilot symbol location and the phase at a previous pilot symbol location; and choosing the most probable frequency offset from a frequency offset selector from amongst a set of all frequency offsets that give rise to the same phase difference.

8. A method for extracting the frequency offset information as in claim 7, further comprising the step of:

reducing noise of the frequency estimate using a smoothing filter.

* * * * *